April 5, 1949.  W. A. STEARNS  2,466,335
OIL SEAL
Filed Oct. 4, 1945

Inventor
Willard A. Stearns
By Clayton L. Jenks
Attorney

Patented Apr. 5, 1949

2,466,335

UNITED STATES PATENT OFFICE 2,466,335

OIL SEAL

Willard A. Stearns, Detroit, Mich., assignor to Graton & Knight Company, Worcester, Mass., a corporation of Massachusetts Application October 4, 1945, Serial No. 620,360

6 Claims. (Cl. 288—3)

1

This invention relates to oil seals and more particularly to a self-contained, pre-assembled sealing or packing unit or retainer adapted to be mounted within a housing and prevent the escape of oil and other fluid material.

A standard type of packing ring or oil seal comprises a casing or packing ring container carrying a sealing element made of leather or other suitable material which has an axially extending portion held in a firm wiping contact with a relatively movable shaft, or housing and a radial flange sealed against a casing wall to prevent the escape of oil. Various constructions have been employed for holding the two ends of the sealing element in an oil retaining position, and these usually comprise a garter spring or the resilient fingers of a conical spring member which hold the sealing element against the shaft, or against a peripheral housing wall, if the seal is rotated with the shaft. In the usual construction, the seal wipes against a rotating shaft and its radial flange is clamped between flanges or pressed against a wall of the packing ring casing. These prior seals have presented certain disadvantages inherent in the construction which defeat the intended purposes.

The primary object of this invention is to provide a seal of this general type in which a garter spring is positively and accurately positioned relative to the sealing element, so that the pressure of the spring is applied exactly at the desired location.

A further object is to provide a compression and locating member which contacts with the radial flange of the sealing element at two widely spaced points near its outer and inner peripheries, so as to provide a double seal of equalized pressures and an extensive area of contact with a radial wall of the packing case, and thus insure a more positive and effective sealing and preventing static leakage between the outer radial shell and the sealing element.

A further object of the invention is to provide a construction in which the compression member that holds the radial flange of the seal against the casing wall is so constructed that it remains stiff and rigid and will not bend or spring out of shape when pressure is applied to force the parts into position within the casing or when the packing casing itself is forced into the oil sealing recess in the housing of the enclosing structure.

A further object is to provide a construction which insures proper alignment of the parts of the seal during assembly and the maintenance of a correct radial position and spacing relative

2 to the shaft for the closing washer or cap which holds the compression member and its associated parts in proper position.

A further object is to provide the compression member with a relatively broad radial surface against which the closing washer bears, so that the pressure involved in closing the parts and forcing the compression member against the radial flange of the seal is evenly distributed and insures a proper positioning and a secure locking of the parts.

A further object is to provide a large space within which oil may flow and dissipate the heat generated by friction of the sealing lip against the shaft.

Another object is to provide the compression member with spaced tongues which locate it properly relative to the inner periphery of the enclosing casing and thus hold it concentrically in place but largely out of contact with that peripheral wall and thus insure a positive clamping of the compression member against the sealing member flange at a point somewhat distant from its outer peripheral edge so as to insure holding the periphery of the sealing member in a proper position. Other objects will be apparent in the following disclosure.

Referring to the drawings which illustrate preferred embodiments of this invention:

Figure 1:
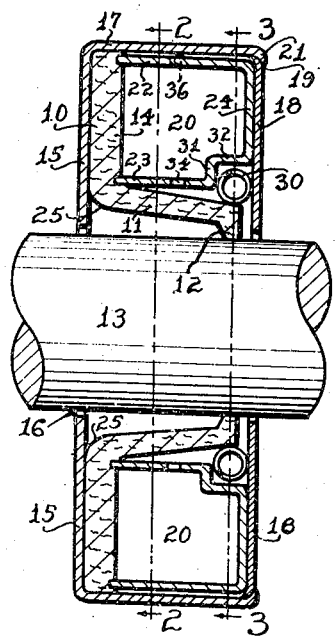
Fig. 1 is a vertical sectional view showing an oil seal applied to a rotatable shaft.
Figure 2:
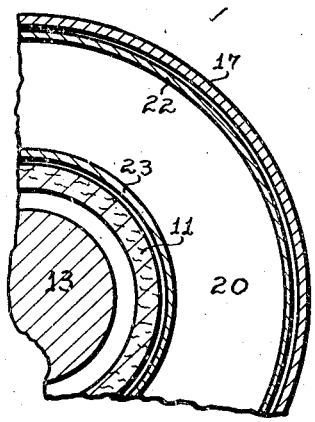
Fig. 2 is a section on the line 2—2 of Fig. 1.
Figure 3:
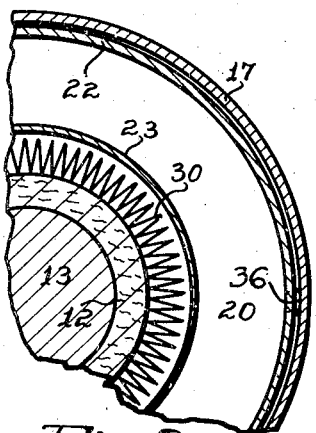
Fig. 3 is a section on the line 3—3 of Fig. 1.

An oil seal or packing made in accordance with my invention comprises a sealing element of suitable material, such as treated or untreated leather, natural or synthetic rubber, felt or other textile material, or a suitable flexible plastic, which is impervious to the passage of oil or other fluid and is shaped and arranged to form a tight and yet yielding seal against a moving body, such as a central shaft or reciprocating rod or a stationary peripheral wall of a housing surrounding a revolving seal. This seal may have a somewhat conical or cup shape and be mounted within a casing or shell which is so constructed and shaped that it may be press fitted or otherwise secured tightly in an opening in the housing of the machine which surrounds the rod or shaft. In the construction of Figs. 1, 2 and 3, the sealing element 10, which may be made of a suitably treated, flexible leather, has a portion 11 having a lip 12 riding in a wiping and sealing engagement with the rotatable shaft 13. The part 11 is annular and substantially parallel with the shaft axis and is herein termed as "axial" or "axially extending." A radial flange 14 of the seal has its rear surface in close engagement with the inner face of a radial wall 15 of the enclosing casing. This wall is an annulus having its inner peripheral edge 16 surrounding and slightly spaced from the shaft 13. A cylindrical or axial wall 17 integral with the radial wall 15 forms therewith a cup within which the sealing element is mounted. The outer cylindrical face of the axial wall 17 is normally arranged to be press fitted into a cylindrical recess of the machine frame or housing which surrounds the shaft and they are suitably shaped to provide an oil seal therebetween. A further ring shaped wall or locking washer 18 serves as a cover for the housing and thus form with the walls 15 and 17 a U-shaped, or channeled, annular enclosure which, with the shaft 13, surrounds or encloses the oil seal 10. The casing walls may be formed of a suitable metal, such as aluminum, steel, brass or copper, or a suitable plastic material of required strength and rigidity, such as a phenol formaldehyde condensation product or the equivalent urea and melamine resins. The cup may be suitably made by a stamping or turning operation. The washer 18 is preferably provided with a pinched off edge 19 which assists in locating the parts and over which the outer edge 21 of the annular shell wall 17 may be rolled to secure the washer permanently in position.

A primary feature of this invention comprises two spaced compression walls holding the radial portion 14 of the sealing element against the adjacent radial casing wall. These walls are preferably made integral with a joining wall and shaped as a channeled annular cup. This cup 20 is so constructed and arranged that it seals the radial flange 14 of the sealing element or packing 10 against the radial wall 15 of the housing in localized concentric annular areas. As illustrated, this member 20 is shaped as an annular cup having two spaced peripheral or axially extending, annular, concentric walls 22 and 23 connected by a radial wall 24. The axial walls 22 and 23 are of such length that when the closure or washer 18 has been locked into place, the free edges of the walls 22 and 23 are pressed tightly against and indenting the radial portion 14 of the sealing element 10 and thus at these two annular locations force the element 10 into a very tight and oil sealing engagement with the inner surface of the radial wall 15. This provides a double seal, one near the outer edge of the leather member 10 and the other near the bend 25 where the radial flange 14 joins to the axial portion 11 of the leather seal. Thus the oil is held at the right hand side of the oil sealing element and cannot escape between the radial flange 14 and the casing wall 15.

The radial wall 24 of the annular cup or compression member 20 has its outer surface parallel and contacting with the inner flat surface of the closure or washer 18. This has two major functions. One involves the fact that the act of rolling over the lip 21 of the annular wall 17 against the washer provides a force which is transmitted evenly to embed the two annular legs or axial walls 22 and 23 evenly and to uniform extent in the seal flange portion 14. The other function lies in that this radial portion 24 serves as a guide or platform against which the washer 18 lies at the beginning of assembly and thus prevents the washer from becoming tilted or in any way moving out of a proper position. Hence, when the bead 21 is rolled against the washer 18, the latter necessarily assumes a position which is determined by that radial wall 24 of the compression member, and this position is substantially parallel with the opposite radial wall 15 of the casing.

As a further feature of this construction, a spring member, such as a radially contracting, helical garter or tension coil spring 30 of suitable construction, is so located by the compression member 20 that is presses against the seal in a correct position. For this purpose, the compression member 20 is provided with an annular recess formed by the radial wall 31, normal to the center line of the shaft, and the axial wall 32 parallel with the shaft axis. The recess faces of these two walls and the associated closure wall 18 are locating or guide members forming a U-shaped channel for the garter or annular helical spring 30, and they are so positioned that the spring engages the seal 10 at substantially a medial position of the lip 12 or on the line 3—3 of Fig. 1, so that the line of pressure of the garter spring shall be opposite the center of the contact area of the seal with the shaft. Likewise, if the seal is what is termed a straight edged type, then the contractile garter spring 30 preferably engages the seal at a point substantially opposite the outer edge of the seal at its line of engagement with the shaft. By applying the radial pressure close to the edge of the sealing element, this prevents the end of the element from curling up or expanding away from the shaft as may happen when the line of constricting pressure is too far removed from that edge. It also serves to reduce the friction of the sealing element against the shaft. The wall 32 of the recess in the compression member is spaced materially from the garter spring, so that latter may move freely in a radial direction, but the walls 31 and 18 are fairly close to the garter spring, such as with a clearance of about $1/64''$, so that the garter spring is accurately located, although not hampered in its constrictive movement.

The clearance between the wall 32 and spring gives ample space for oil circulation around the garter spring and through the coils thereof. Also, I preferably provide a series of holes 34 through the inner axial wall 23, so that the oil in the space between that wall and the axial flange 11 of the seal may circulate into the space within the compression cup 20. This provides an ample volume of oil to take up and dissipate the heat that is generated by the friction of the sealing lip 12 against the shaft and thus serve to cool the parts.

Figure 4:
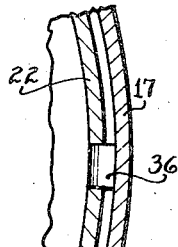
Fig. 4 is a fragmentary detail showing the tongue on the compression member.

The compression member 20 may be formed by various operations, such as stamping it from sheet metal by means of dies, or it may be produced by turning or spinning the same. This member may be made of steel, aluminum, brass or other desired metal or plastic that has this required strength and rigidity for the purpose. As an aid in assembly I may strike three or more tongues 36 (Fig. 4) from the annular wall 22 of the compression member and bend them outwardly so as to serve as guides that locate the compression member relative to the annular wall 17. However, if desired, these tongues may be omitted and the two walls be brought into contact. The tongues 36 are a help in assembly of the parts and do not require an extreme accuracy of fit. More important, they locate the axial wall 22 away from the outer edge of the flange 14 of the leather element 10 and so insures that it will not slide off or cut away the edge.

Figure 5:
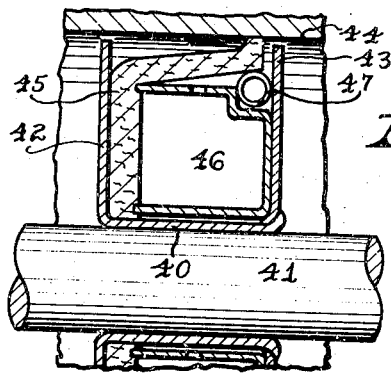
Fig. 5 is a fragmentary sectional view of a similar construction having its parts reversed so that the seal wipes against an inner peripheral wall of the outer housing.

The construction of Fig. 5 shows how the parts may be reversed, so that the oil seal may be operated against the inner annular face of a stationary housing. In this case, the axial wall 40 of the outer casing is press fitted on the shaft 41 so as to rotate therewith. The radial wall 42 of the casing is parallel with the closure or washer 43, and these two walls are spaced somewhat from the annular peripheral surface 44 of the housing. The flexible leather or other oil seal member 45 is held in position against that inner wall 44 by means of the compression element 46 which may be made as above described, and the radially expanding, helical garter spring 47 holds the oil seal 45 in position while the casing and the oil seal are rotated with the shaft. The construction may be as above described except for this reversal of locations.

Figure 6:
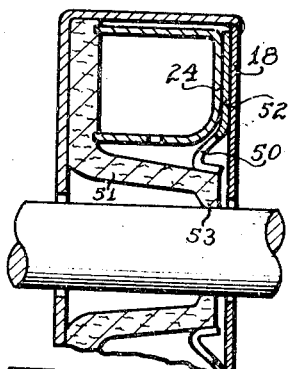
Fig. 6 shows a modified construction in which a split finger spring is employed.

In Fig. 6 I have illustrated a construction like that of Fig. 1 except that the garter spring is replaced by a one piece annular split ring having resilient pressing fingers 50 in engagement with the axial portion 51 of the sealing element. This resilient finger spring has a radial annular portion 52 parallel with and clamped between the parallel walls of the washer 18 and the radial wall 24 of the compression cup. The fingers 50 are suitably bent to provide adequate resiliency and to insure a proper contact with the medial portion 53 of the sealing lip. The construction may be otherwise as above described with reference to Fig. 1.

Figure 7:
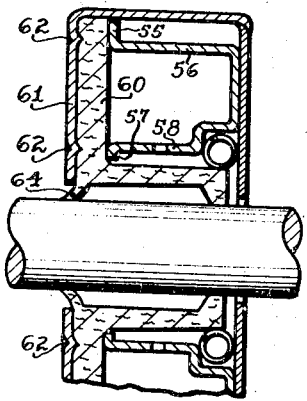
Fig. 7 shows a construction similar to Fig. 1 in which a dust seal is provided.

The modification of Fig. 7 has the compression cup provided with an annular flanged foot 55 on the outer cylindrical wall 56 and another flanged foot 57 on the inner wall 58. The outer foot 55 serves to locate the compression cup wall 56 spaced from the annular wall 59 of the outer cup, and each of these feet gives a larger bearing surface against the radial flange 60 of the oil sealing element. The radial wall 61 of the outer cup may have punch marks 62 struck into its outer side, and these cause the metal of the wall to press inwardly into a tight engagement with the radial wall 60 of the seal and thus provide a further means of locating and sealing that wall against the feet 55 and 57. This more securely locks the sealing element against rotation within the case.

In Fig. 7, I have shown a further modification wherein the sealing element has an annular finger 64 projecting downwardly and in engagement with the shaft so as to form a dust seal or a second seal which aids in preventing the passage of foreign material into the space within the housing. This second sealing member may be made of leather, rubber or other material suitably secured to the remainder of the sealing element, or the whole element may be made of rubber or other suitable material and provided with this extra flange.

Figure 8:
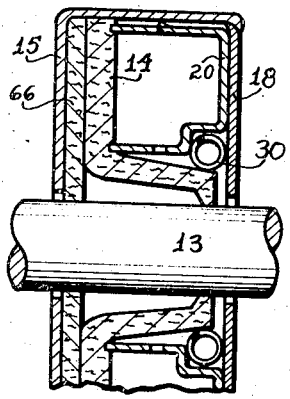
Fig. 8 is a further modification showing a double seal.

In Fig. 8, I have shown a construction similar to Fig. 1 except that a ring shaped radial washer 66 made of felt, leather, rubber or other suitable flexible material may be cam pressed within the space between the outer wall 15 and the radial portion 14 of the main seal. The inner annular edge of the washer 66 contacts with the shaft, or is squeezed against it, and so serves as a dust or dirt seal to exclude foreign matter from within the casing interior.

In view of the above disclosure, it will be appreciated that various modifications may be made in the construction within the scope of my invention, such as a reversal of the parts so that the radial flange of the sealing element engages the closure wall. Also, the operation and various advantages of the device have been made apparent. In particular, I have provided a construction which has widely spaced, annular areas serving as a leakproof, static seal between the radial flange of the sealing element and the radial wall of the casing. Also, the washer or closure 18 is properly located so that when the casing is driven with a press fit into the machine housing, the parts of the seal cannot be seriously distorted or to such a material extent as to interfere with a proper sealing action. The radial wall 24 of the inner compression cup gives such strength and rigidity to the construction that the washer 18 supported thereby may be made of comparatively thin material with a resultant saving of cost. The reentrant groove formed by the walls 31 and 32 of the compression cup further aids in strengthening the cup as well as serving as a guide and locator for the spring during assembly and use. This holds the spring in a closely confined and predetermined position near the sealing edge of the axial flange of the leather or other sealing element used and so prevents it from curling at its edge or getting out of proper contact with the shaft. The free ends of the walls 22 and 23 of the compression cup have a comparatively narrow area of contact against the radial flange of the sealing element, and thus the compression force is so localized as to provide a very tight contact with the axial wall of the housing. It may also be observed that the compression feet 55 and 57 of Fig. 7 are comparatively narrow and so give the desired localized pressure. Thus these various constructional features cooperate to produce a very strong housing with an adequate seal both against the shaft and against a wall of the casing so that oil cannot escape. It is also to be understood that this construction may be used as a packing or seal for other fluids as well as oil, such as where applied to a sliding piston or a pump shaft or other reciprocating or rotary bodies to exclude vapors, gases, liquids or other material, such as dust in gas or liquid suspension. Hence the term "oil seal" as used herein is to be interpreted broadly.

Having thus described my invention, what I claim as new and desire to secure by Letters Patent is:

1. An oil seal for a shaft comprising an annular casing having a radial wall and a closure wall spaced therefrom which surround the shaft, a sealing element having an axial portion in wiping contact with the shaft and an annular radial portion contacting with the radial wall, a fixed annular U-shaped compression member having spaced, concentric, peripheral walls held by the closure wall and directly engaging and being embedded in the radial portion of the sealing element and pressing it against the radial wall of the casing in spaced localized concentric areas, and a garter spring engaging the axial portion of said element which is held by the compression member against axial movement and in a radial compressing contact with a predetermined lip portion of the sealing element.

2. An oil seal for a shaft comprising a casing having an annular radial wall, a closure wall parallel thereto, a flexible sealing element having a radial flanged portion in contact with one casing wall and an axial portion arranged for a wiping contact with a shaft, a garter spring surrounding and holding said axial portion in position and a compression member having an annular axial wall and a radial wall, the axial wall pressing against a localized area of the radial portion of the element and holding it in an oil sealing relation against the radial wall, and the garter spring being axially confined between the closure wall and the radial wall of the compression member so that it always presses the most effective sealing portion of the sealing element against the shaft.

3. An oil seal comprising a U-shaped casing having an annular radial wall, a closure wall parallel thereto and a peripheral wall, an annular sealing element having an axial portion for wiping engagement with a shaft and a radial portion engaging said annular radial wall, a compression member having spaced concentric cylindrical walls positioned by the closure wall and pressing the radial portion of the sealing element against the radial casing wall in localized spaced areas and a resilient spring axially confined between the compression member and the closure wall which holds the sealing element against the shaft.

4. An oil seal comprising a casing having an annular radial wall, a peripheral wall and a radial closure wall forming a U-shaped annular body arranged to surround a shaft and to be mounted in a housing, an oil sealing element having an axial portion in wiping contact with the movable part to be sealed and a radial portion engaging said radial wall, a U-shaped compression member having a radial wall engaging and supporting the closure wall and two spaced cylindrical axial walls pressing the radial portion of the sealing element against said radial casing wall in localized concentric areas and a garter spring holding the axial portion of the sealing element in position, said compression member having an axial wall and a radial wall forming a reentrant annular recess, the radial wall of the recess being located parallel with and spaced from the closure wall to form a confining channel for holding the garter spring substantially immovable axially.

5. An oil seal comprising a radial wall and a cylindrical peripheral wall shaped as an annular cup arranged to surround a shaft, a closure wall parallel to the radial wall and held by a rolled bead on the peripheral wall, a sealing element having an axial portion and a radial portion, an annular spring engaging and locating the axial portion, and a U-shaped compression member having a radial wall parallel with and retained by the radial wall of the cup which supports and locates the closure during assembly and two spaced cylindrical walls pressed by the closure wall directly into and making oil sealing contact with the radial portion of the sealing element at spaced, localized concentric areas.

6. An oil seal comprising a U-shaped casing having a radial wall and a radial closure wall spaced therefrom and connected by a cylindrical wall, a sealing element in the casing having axial and radial portions, a garter spring closely surrounding the axial portion, a hollow, annular U-shaped compression member having a radial wall locating and supporting the closure and two spaced cylindrical walls which press the radial portion of the element against said radial wall in spaced localized concentric areas, said member having a reentrant groove providing a radial wall spaced from the closure wall which confines the garter spring and prevents axial movement thereof, said hollow member having an opening for the free passage of oil.

WILLARD A. STEARNS.

REFERENCES CITED

The following references are of record in the file of this patent:

UNITED STATES PATENTS

| Number | Name | Date |
| --- | --- | --- |
| 1,807,568 | Clark | May 26, 1931 |
| 1,812,385 | Troyer | June 30, 1931 |
| 1,963,465 | Johnson | June 19, 1934 |
| 2,040,379 | Heinze | May 12, 1936 |
| 2,291,570 | Clark | July 28, 1942 |

FOREIGN PATENTS

| Number | Country | Date |
| --- | --- | --- |
| 481,155 | Great Britain | 1938 |